United States Patent
Ewing et al.

(10) Patent No.: US 7,045,021 B2
(45) Date of Patent: May 16, 2006

(54) CUSTOMIZABLE VEHICLE WASH BLENDING SYSTEM AND METHOD

(75) Inventors: Murray Ewing, Cambridge (CA); Jeff Ousborne, Clarksville, MD (US); Erik Eden, Damascus, MD (US); David Honigs, Hagerstown, MD (US); Fred J. Eden, Jr., Damascus, MD (US)

(73) Assignee: Unitec, Inc., Elkridge, MD (US)

( * ) Notice: Subject to any disclaimer, the term of this patent is extended or adjusted under 35 U.S.C. 154(b) by 455 days.

(21) Appl. No.: 10/366,549

(22) Filed: Feb. 14, 2003

(65) Prior Publication Data

US 2004/0159342 A1    Aug. 19, 2004

(51) Int. Cl.
*B08B 3/00* (2006.01)

(52) U.S. Cl. .............. 134/29; 134/18; 134/26; 134/42; 134/113; 134/123; 134/56 R (58) Field of Classification Search ............ 134/18, 134/26, 29, 42, 56 R, 113, 123
See application file for complete search history.

(56) References Cited

U.S. PATENT DOCUMENTS

| | | | |
|---|---|---|---|
| 3,599,650 A | 8/1971 | Abraham | |
| 3,726,293 A * | 4/1973 | Padek | 134/45 |
| 3,854,054 A | 12/1974 | Conn, Jr. | |
| 3,911,938 A | 10/1975 | Wiltrout | |
| 4,020,857 A | 5/1977 | Rendemonti | |
| 4,865,058 A * | 9/1989 | Crotts et al. | 134/45 |
| RE33,849 E | 3/1992 | Detrick | |
| 5,160,430 A | 11/1992 | Gasser et al. | |
| 5,226,436 A | 7/1993 | Kirby | |
| 5,413,128 A | 5/1995 | Butts | |
| 5,432,974 A | 7/1995 | Yasutake et al. | |
| 5,447,574 A | 9/1995 | Inoue | |
| 5,482,212 A | 1/1996 | Kobryn et al. | |
| 5,853,494 A | 12/1998 | Andersson | |
| 5,871,590 A | 2/1999 | Hei et al. | |
| 5,884,840 A | 3/1999 | Bagnara et al. | |
| 5,886,648 A | 3/1999 | McElroy et al. | |
| 5,981,458 A | 11/1999 | Crutcher et al. | |
| 6,042,730 A | 3/2000 | Lahti | |
| 6,061,668 A | 5/2000 | Sharrow | |
| 6,088,864 A | 7/2000 | Smith, II | |
| 6,277,207 B1 | 8/2001 | Gauthier | |
| 6,864,220 B1 * | 3/2005 | Levitt et al. | 510/424 |
| 2002/0016746 A1 | 2/2002 | McHenry et al. | |

* cited by examiner

*Primary Examiner*—Zeinab El-Arini
(74) *Attorney, Agent, or Firm*—Rosenberg, Klein & Lee (57) ABSTRACT

A customizable car wash blending and method is provided. The method includes the steps of positioning a vehicle adjacent a set of sensors (step 10), measuring a variety of parametric data relating to macroscopic debris and surface film formed on a surface of the vehicle, calculating the quantity of presoak components to be added to a presoak solution (step 70), blending the presoak solution (step 80), and applying the presoak solution to the vehicle (step 110). Quantities of presoak enhancing agents are also calculated from the sensor readings (step 120) along with the calculation of the number and type of wash cycles required for the vehicle (step 130).

38 Claims, 4 Drawing Sheets

CUSTOMIZABLE VEHICLE WASH BLENDING SYSTEM AND METHOD

BACKGROUND OF THE INVENTION

Field of the Invention

The subject invention relates to a customizable car wash blending system and method. In particular, the system and method direct themselves to the positioning of a vehicle in locational correspondence with at least one set of sensors. More particularly, the sensors measure parametric data relating to macroscopic debris and surface film formed on a surface of the vehicle. Further, this invention directs itself to a computer control system for receiving the parametric data from the plurality of sensors. The computer control system calculates ratios of presoak compositions for forming a presoak solution based upon the parametric data.

Further, a presoak blending sub-system is in communication with the computer control system. The presoak blending sub-system blends and applies the presoak solution to a surface of the vehicle. Additionally, this invention directs itself to a presoak enhancer blending sub-system in communication with the computer control system for blending and applying presoak enhancer agents to the surface of the vehicle. More particularly, this invention is directed towards a vehicle wash sub-system in communication with the computer control system for washing the vehicle in accordance with a predetermined number and type of wash cycles responsive to the measured parametric data. Additionally, the system and method are directed to a car or vehicle rinse sub-system in communication with the computer control system for rinsing the vehicle with a predetermined number and type of rinse cycles responsive to the measured parametric data.

Prior Art

Methods and systems for washing of vehicles are well-known in the art. In general, such systems and methods include a plurality of selections for customizable car washing. In many instances, the problems of such prior art systems and methods are that the car wash options are not dependent upon measurements of various parametric data relating to the debris and film formed on the vehicle. Thus, the vehicle does not receive an optimal cleaning. It is a purpose of the subject invention to provide a combination of elements and steps making up a system and method for customizable car wash blending which allows for the measurement of specific parametric data relating to the debris and film formed on a vehicle and the blending of a presoak solution to be applied to the vehicle based specifically upon the vehicle's cleaning needs.

One such prior art system is shown in U.S. Pat. No. RE33,849. This reference is directed to a computerized car wash controller system. For each car, the car wash operator selects a particular input. The input relates to the type of car wash to be applied. The system further includes a car wash sensor that senses the presence of a car and generates an appropriate signal. This system, however, does not include a bank of sensors for measuring parametric data relating to debris and film formed on the surface of the vehicle, nor does it include an automatic blending system based upon the parametric data received by the sensors.

Another such prior art system is shown in Patent Application Publication #2002/0016746 A1. This system is directed to customized motor oil selection. In this system, a user fills out a questionnaire relating to vehicle type and use. Depending on the answers in the questionnaire, the system chooses an appropriate motor oil for the user's vehicle. The system, however, does not include actual measurement of data relating to the vehicle, nor does it include a customizable blending system.

U.S. Pat. No. 6,061,668 is directed to a control system for pay-per-use applications. This system allows a user to choose from a variety of services offered, such as different types of car washes. However, the system does not include a set of sensors for receiving parametric data relating to the vehicle to be washed, nor does it include a customizing blending system.

U.S. Pat. No. 3,599,650 is directed to a car wash. This system allows for the washing of various types of vehicles, and provides for different varieties of washes. However, it does not include sensors for measuring parametric data relating to the vehicle, nor does it include a customizable blending system.

Another prior art car washing system is shown in U.S. Pat. No. 6,277,207. This reference is directed to a control system for a vehicle washing system. This system utilizes a plurality of sensors to determine the length of a vehicle, the position of a vehicle relative to a fixed track upon which a gantry travels, and the profile of a vehicle relative to the track. The system, however, does not include sensors for measuring parametric data relating to the specific types of debris and film formed on the vehicle.

None of the prior art provides for a combination of elements or steps forming a customizable car wash blending system and method which utilizes a plurality of sensors to measure parametric data relating to the type and quantity of macroscopic debris and surface film formed on a vehicle. Additionally, none of the prior art patents provide for a system or method for the customizable blending of presoak solutions to be applied to a vehicle based upon the parametric data received. Additionally, none of the prior art provides for a computer control system which calculates appropriate numbers and types of car wash cycles and rinse cycles for the vehicle based upon the parametric data on the specific quantities and types of macroscopic debris and surface film formed on the vehicle.

SUMMARY OF THE INVENTION

The present invention provides for a customizable car wash blending system and method. The system includes a plurality of sensors for measuring parametric data relating to macroscopic debris and surface film formed on a surface of a vehicle. A user positions his vehicle in locational correspondence with the plurality of sensors. The sensors accumulate measured data and communicate the parametric data to a computer control system. The computer control system calculates specific ratios of presoak compositions for forming a presoak solution customized to the exact quantities and types of debris and film formed on the vehicle. The computer control system communicates the calculated ratios of presoak compositions to a presoak blending sub-system. The presoak blending sub-system blends the appropriate presoak solution and applies the presoak solution to the vehicle.

The computer control system further calculates required quantities of presoak enhancer agents to be additionally applied to the surface of the vehicle in order to enhance the reaction and efficiency of the presoak solution. The presoak enhancer blending sub-system blends the appropriate quantities of presoak enhancer agents and applies the presoak enhancers to the surface of the vehicle. Further, the computer control system is in communication with a vehicle or car wash sub-system and a car rinse sub-system. The computer control system calculates the number and types of wash cycles and rinse cycles needed for a vehicle dependent upon the specific types and quantities of debris and surface film formed on the surface of the vehicle.

It is a principal objective of the subject customizable car wash blending system and method to provide a plurality of sensors for measuring parametric data relating to macroscopic debris and surface film formed on a surface of a vehicle.

It is a further objective of the subject car wash blending system and method to provide a computer control system for receiving parametric data relating to macroscopic debris and surface film formed on a surface of a vehicle and for calculating quantities of presoak compositions for forming a presoak solution responsive to the specific parametric data.

It is a further objective of the subject invention to provide a presoak blending sub-system in communication with the computer control system for blending a presoak solution from the calculated quantities of presoak compositions to be applied to the vehicle.

It is a further objective of the subject invention to provide a presoak enhancer blending sub-system to blend presoak enhancing agents responsive to the parametric data received by the computer control system and to apply the presoak enhancer agents to the vehicle.

It is an important objective of the present invention to provide car wash and car rinse sub-systems in communication with the computer control system for providing specific numbers and types of car wash cycles and car rinse cycles dependent upon the specific quantities and types of debris and surface film formed on the surface of the vehicle.

DESCRIPTION OF THE PREFERRED EMBODIMENTS

Figure 1:
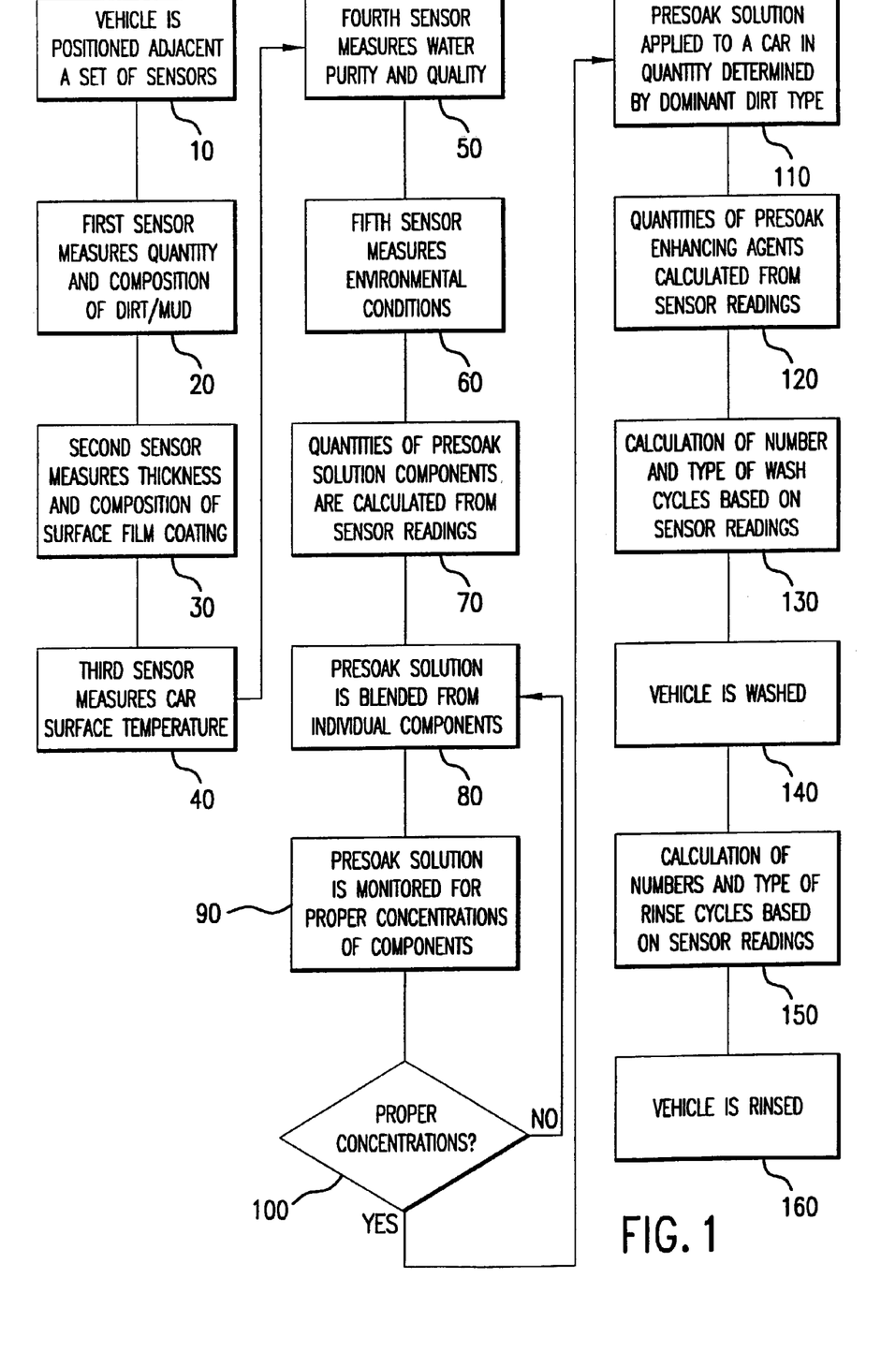
FIG. 1 is a flow chart illustrating the steps of the customizable car wash blending method.

Referring to FIG. 1, there is shown a flow chart illustrating the steps of the customizable car wash blending method. As shown in FIG. 1, at step 10, a vehicle is initially positioned adjacent a set of sensors. The set of sensors may be located in close proximity to a car wash and are designed for measuring quantities and compositions of dirt and other environmental debris formed on a surface of the vehicle, external environmental conditions, water purity and quality, and the like.

As shown in FIG. 1, at step 20, a first sensor measures the quantity and composition of dirt, mud or other macroscopic debris formed on the surface of the vehicle. The sensor may utilize measurements of reflectance or scattering of infrared light, ultraviolet light, visible light, radio frequency electromagnetic radiation, or the like. Typical optical reflectance/scattering sensors employ fiber optics to measure light backscatter; i.e., light reflected off particles in the opposite direction of incidence. Reflectance sensors are well-known in the art and one such sensor is the FiberView Sensor produced by Reflectronics, Inc., of Lexington, Ky.

Following the measurement of the quantity and composition of dirt, mud and other macroscopic debris formed on the surface of the vehicle at step 20, a second sensor measures the thickness and composition of a surface film coating on the vehicle at step 30. Due to acid rain and other environmental conditions, along with sprays of chemical compositions, both organic and inorganic, from road travel and external environmental conditions, vehicles typically have a thin film of minerals and various chemical compounds formed on their surfaces. Typically, these films are formed from aluminum, magnesium silicates, titanium dioxide, sulfates, chlorides, and carbonates of iron, copper, calcium, sodium, magnesium, and potassium. Aluminum, iron, calcium, and silicon layers are often formed from soil erosion, rock dust, and coal combustion. A carbon surface film often comes from the incomplete combustion of carbonaceous fuels. Sodium chloride layers typically form due to marine aerosols, and chloride from the incineration of organochlorine polymer wastes.

Additionally, surface films found on vehicles include various types of soil, rubber, exhaust gases, salt, sand, herbacides, pestacides, fertilizers, brake dust, industrial pollutants, and the like.

The second sensor, of step 30, shown in FIG. 1, is a reflectance or backscattering sensor, similar to the first sensor of step 20. The sensor may utilize visible light, infrared light, ultraviolet light, radio frequency electromagnetic radiation, X-rays, or the like. Additionally, the second sensor of step 30 may include an ultraviolet fluorescence sensor. Ultraviolet fluorescence sensors are well-known in the art and one such sensor is the Ultra-Violet Fluorescence Sensor Model 120 manufactured by NDC Infrared Engineering of Irwindale, Calif.

Following the measurement of the thickness and composition of the surface film coating in step 30, a third sensor measures the vehicle surface temperature at step 40. The vehicle surface temperature may be measured through measurement of infrared radiation being emitted by the vehicle, or may be performed by a standard contact thermometer.

As shown in FIG. 1, at step 50, a fourth sensor measures water purity and quality. In order to completely and efficiently remove both the macroscopic debris and the surface film formed on the surface of the vehicle, the water used in the wash cycle must have sufficient purity and quality. Activity, pH, temperature, turbidity and levels of dissolved salts and other solids must be measured. Multi-parameter water analyzers are well-known in the art. One such water analyzer is the PHH-500 Multi-Parameter Water Analyzer produced by Omega Engineering, Ltd. of Stamford, Conn.

Following the measurements of the water purity and quality at step 50, a fifth sensor measures environmental conditions at step 60. Determination of the proper quantities and concentrations of cleaning components are dependent upon the external temperature, humidity, and precipitation. Humidity and temperature probes are well-known in the art. One such probe is the MP101A Meteorological Probe produced by Rotronic of Huntington, N.Y.

Based upon the measurements of the quantity and composition of dirt, mud and other macroscopic debris, the thickness and composition of surface film formed on the vehicle, the car surface temperature, the water purity and quality, and the external environmental conditions, proper quantities of presoak solution components are calculated at step 70. A presoak solution is applied to the surface of the vehicle to act on the macroscopic debris and surface film in order to break down the structure and composition of the debris and film in order to make washing more effective.

Figure 3:
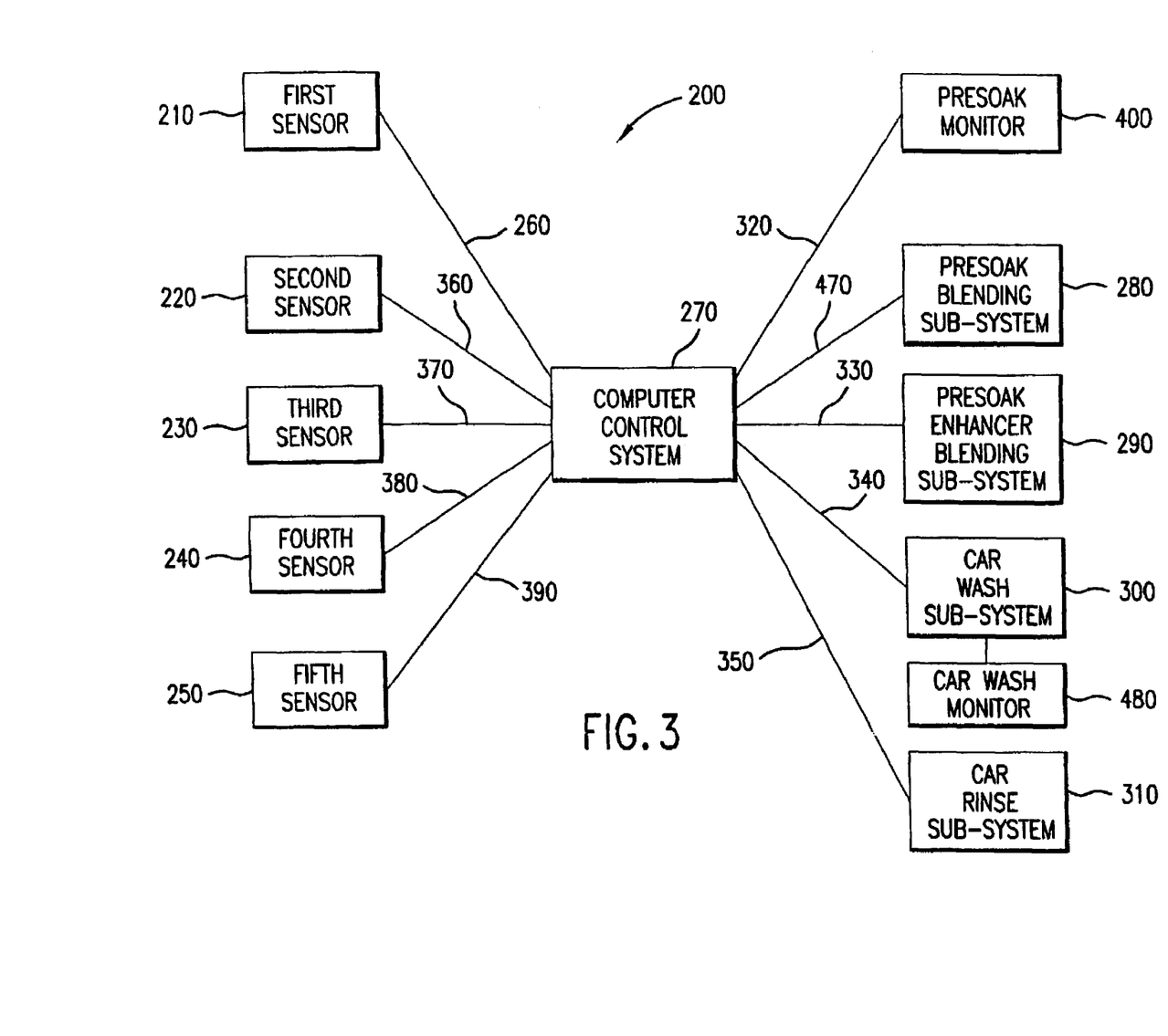
FIG. 3 is a schematic diagram illustrating the customizable car wash blending system; and, FIG. 4 is a flow chart illustrating the computer algorithm for generating an appropriate presoak solution component blend.
Figure 4:
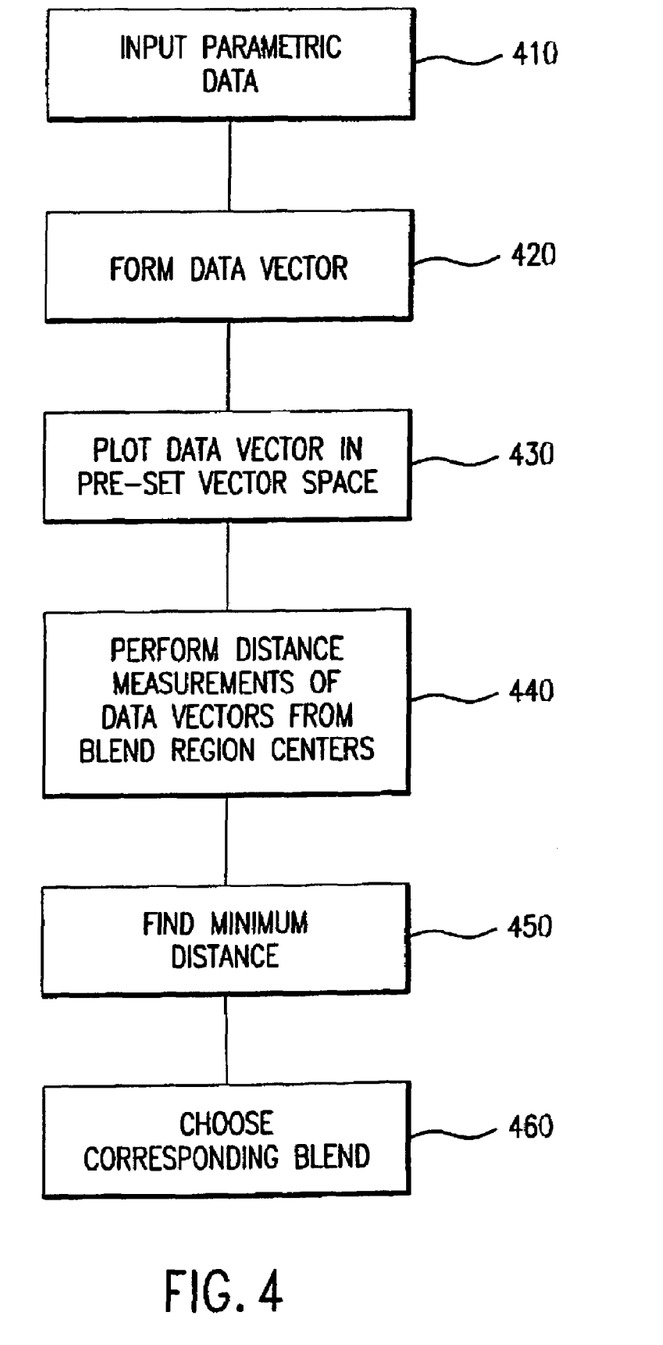

The car wash blending system 200 is illustrated in FIG. 3 of the Drawings. As shown, sensors 210, 220, 230, 240, and 250 communicate with computer control system 270 via data links 260, 360, 370, 380, 390, respectively. FIG. 4 of the Drawings illustrates the calculation process that computer control system 270 performs in order to determine the proper quantities of presoak components to be used to form the presoak solution.

At step 410, of FIG. 4, the computer control system 270, of FIG. 3, receives the parametric data. At step 420, the parametric data is formed into a data vector. The data vector is plotted in a pre-set vector space, illustrated in FIG. 2, and to be described in further detail.

As will be described in further detail, the data vector is compared with a pre-set set of blend vector sub-spaces, illustrated in FIG. 2, and the nearest blend region is chosen. This is performed by a standard distance measurement and comparison, shown in steps 450 and 460, respectively, of FIG. 4.

The presoak solution is made from a blend of several separate chemical components and water. One of the components might typically be an alkali/builder soap. Another one of the components might be an ionic (cationic, anionic, amphoteric or non-ionic) soap. Other soap blend components may be an alternative ionic soap that has a different polarity, a polymer, an enzyme solution, or any of a wide variety of cleaning solutions that have different cleaning characteristics or different cost materials than either the alkali/builder soap or the ionic soap.

In order to determine the proper soap blend to be used, the vehicle appearance is classified as being either predominantly dirt/mud or predominantly film covered. Additionally, the external environmental conditions of the past two or three days is taken into account. Weather conditions change the adhesion properties of surface films. The particular blend of soap components is optimized to clean the car the most efficiently.

Fresh surface films, aged surface films, and dirt/mud can best be removed by different soap blends. The difference between fresh and aged surface films is determined by the past two or three day's precipitation history.

The temperature of the water, measured in step 50, is an important variable in the cleaning of the vehicle. The water temperature must be adjusted depending on the surface temperature of the car (measured in step 40) and the type of soap mix being used. Water temperature is typically adjusted dynamically from car to car by blending a hot stream of water with a colder one.

The concentration of the soap is adjusted depending on the nature of the soap blend, water quality and purity, external air temperature, water temperature, and the surface temperature of the vehicle. For example, the ionic soap concentrations are most effective when adjusted to be near the cloud point. The cloud point is a function of the blend and water temperature on the surface of the car. The past two to three day's precipitation history is also used to determine soap concentrations and water dilutions.

The blending decisions are made by a computer control system which controls the feed rate from several pumps which feed the water and each type of soap into a blending tube or chamber. The blend controls can be, but are not necessarily required to be, continuously variable valves. Alternatively, the valves can be step valves with the predetermined blends available. The vehicle and environmental conditions are used to classify which predetermined blend is closest to an optimal blend under the circumstances.

The computer control system receives the data from the first, second, third, fourth, and fifth sensors of steps 20, 30, 40, 50, and 60, respectively, to form a multi-dimensional vector space. The number of dimensions is equal to the number of sensors. The type of soap blend is determined by calculating which predetermined blend is closest to that point (defined by the sensor readings) in the vector space using a distance metric such as the Mahalonobis distance. Fuzzy logic classifications are alternative ways to determine which blend is closest to being optimal.

The optimal cleaning point in terms of each sensor and the degradation of the cleaning power as a function of changes measured by each sensor defines each predetermined soap blend. For example, one blend may be optimal at 70°, surface temperature and have a useful range of ±10°. A second blend may be optimal at 50° and have a useful range of ±20°. Ignoring the other variables for the sake of this simple example, a car at 68° would be washed using the first blend and a car at 61° would be washed using the second blend. A diagram of this general concept (plotted using only two variables; i.e., surface temperature and the measurement of UV-fluorescence) is shown in FIG. 2 of the Drawings.

Figure 2:
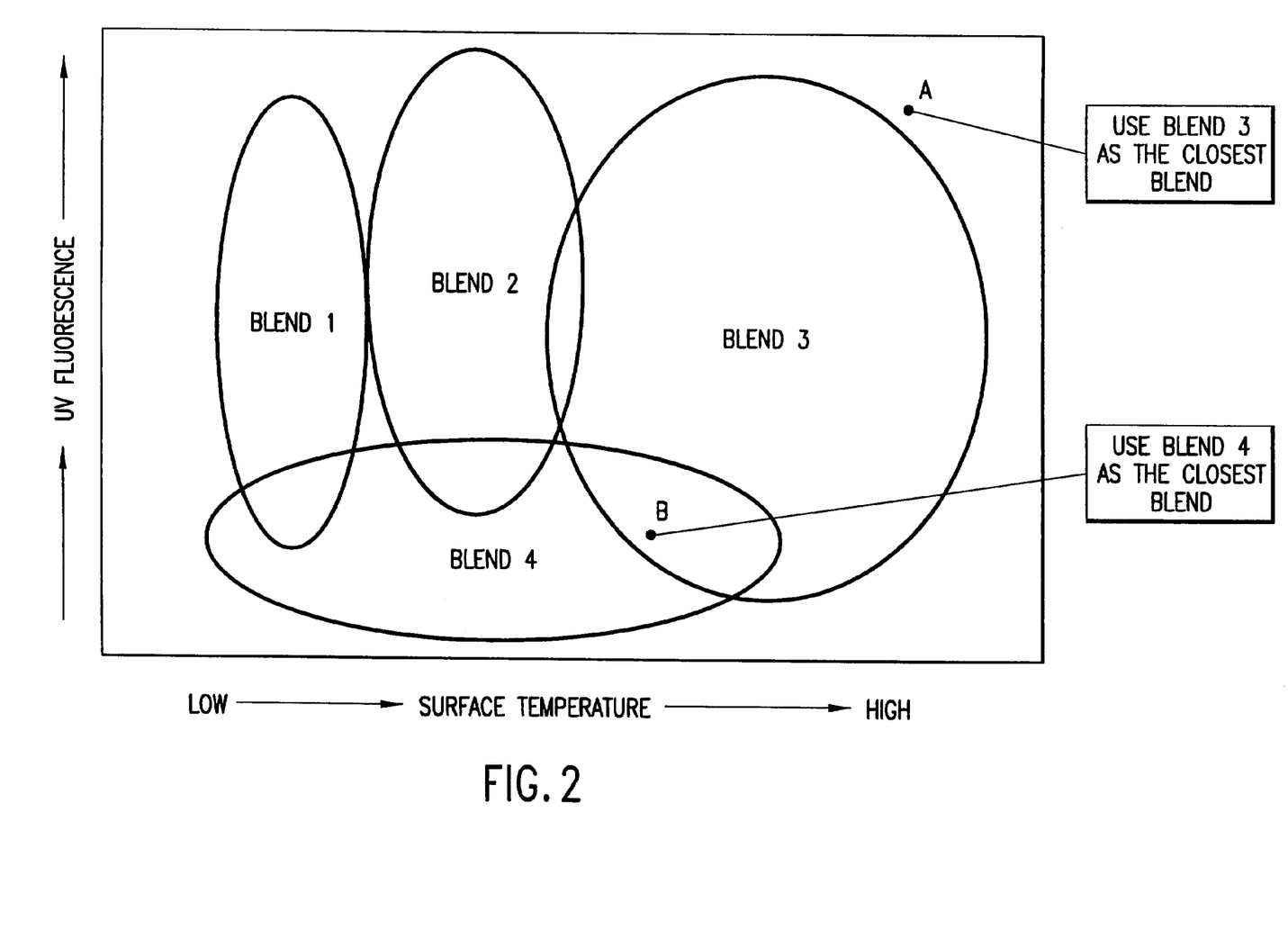
FIG. 2 is a two-dimensional plot showing an exemplary vector space and Venn diagram used by the computer control system in the calculation of presoak solution component blends.

As shown in FIG. 2, predetermined blends 1, 2, 3, and 4 have been calculated for specific measurements of ultraviolet fluorescent and surface temperature. Although the first, second, third, fourth, and fifth sensors of steps 20, 30, 40, 50, and 60, respectively, deliver several variables to the computer control system, only the UV-fluorescence and surface temperature have been plotted in FIG. 2 for the sake of simplicity. The actual determination in the computer control system takes place in a multi-dimensional vector space.

Point A, of FIG. 2, represents an actual measurement of UV-fluorescence and surface temperature measured from the vehicle to be washed. As shown, point A lies outside of the spaces in the vector space occupied by blends 1, 2, 3, and 4. However, through a distance measurement, it can be easily seen that point A lies closest to the center of blend 3. Thus, blend 3 would be used to form a presoak solution for the vehicle. Although point A does not lie within the vector space of blend 3, blend 3 would be more effective at breaking down the dirt, mud, and surface film formed on the vehicle than blends 1, 2, or 4.

Point B, of FIG. 2, lies within the vector space occupied by both blends 3 and 4. However, a simple distance measurement shows that point B is closer to the center of the vector space of blend 4 than the center of blend 3. Thus, blend 4 would be used to form a presoak solution for the vehicle under the conditions of point B. Although blend 3 would also be effective, the proximity of point B to the center of the vector space of blend 4 suggests that blend 4 would be more effective in breaking down the dirt, mud, macroscopic debris, and surface film formed on the vehicle.

Referring to FIG. 1, at step 80, the presoak solution is blended from the individual presoak solution components. The proper quantities and concentrations of the presoak solution components were calculated at step 70 by the computer control system. At step 90, the presoak solution is monitored to determine the actual concentrations of the presoak components. Because the proper quantities, ratios, and concentrations of the presoak solution components are essential to the effective and efficient breaking down of dirt, mud, macroscopic debris, and surface film formed on the vehicle, it is necessary to ensure that the actual blended presoak solution conforms to the calculated quantities, ratios, and concentrations which were determined in step 70.

At step 100, shown in FIG. 1, the computer control system compares the quantities and concentrations of the presoak solution components measured in step 90 with the computed quantities of presoak solution components calculated by the computer control system in step 70. The concentration of each soap component monitored in step 90 can be determined by measuring intrinsic properties of the soap blend or by adding trace elements to each component, such as a particular color or dye.

At step 100, if the computer control system determines that the presoak solution components do not match the calculated quantities and concentrations within a certain tolerance, the computer control system makes adjustments to valve positions, pump pressures, and other sources of mechanical or fluid error. The method then passes back to step 80 where another presoak solution is blended from the individual components and then is monitored to make sure that the new blend now matches the quantities and concentrations calculated at step 70. Additionally, the monitoring of the presoak solution allows for determination of any possible system malfunctions or errors.

Once the computer control system determines that the presoak solution contains the proper concentrations of the presoak components, the system passes to step 110 where the presoak solution is applied to the surface of the vehicle. The quantity of the presoak solution to be applied to the vehicle surface is determined by the dominant type of debris on the vehicle; i.e., mud, dirt, surface film, or other debris.

Once the presoak solution has been applied to the vehicle surface at step 110, presoak enhancing agents may also be added to the vehicle. Foam soaps or other chemical compounds may be applied as necessary to enhance the cleaning ability of the presoak solution. The use of the presoak enhancers is considered and applied as determined by the vehicle's condition and external environmental factors. The computer control system determines the proper quantities of the presoak enhancing agents at step 120 based upon the readings of the first, second, third, fourth, and fifth sensors in steps 20, 30, 40, 50, and 60, respectively.

At step 130, the computer control system calculates the number and type of wash cycles based on the varied sensor readings. Depending on the quantity and type of dirt, mud, debris, and surface film, along with the environmental conditions, different types of car washes are required. The duration of the car wash, the use of friction brushes or other types of brushes, the types and quantities of foaming detergents, and the wash speed represent some of the individual elements of each type of car wash. Additionally, the amount of time required for the presoak solution to act on the macroscopic debris and surface film formed on the vehicle is also determined by the received parametric data.

The dominant dirt type and environmental conditions are used to determine the wash parameters, such as the number of wash cycles, the use of brushes, and the water volume and pressure. The selections are also dependent on the individual car wash since not all car wash installations have the same technologies or settings. Both the water pressure and volume are controlled and monitored to ensure wash quality. Failures may be detected by a second set of sensors placed within the car wash itself, allowing the computer control system to adjust water pressure and volume and notify the operator of the failure.

Once the computer control system has calculated the number and type of wash cycles, at step 130, the vehicle is washed inside the car wash installation at step 140. The computer control system determines the number, speed, water pressure, and water volume of the rinse cycles based upon the dominant dirt type. The calculation of the number and type of rinse cycles based on the sensor readings is performed at step 150. The water pressure and volume are regulated and the second set of sensors, placed within the car wash installation, monitors the water pressure and volume and the computer control system adjusts the pressure and volume as needed.

At step 160, the vehicle is rinsed and, thereafter, the vehicle may be driven from the car wash installation.

FIG. 3 illustrates a system 200 for implementing the method of FIG. 1. As shown in FIG. 3, the customizable car wash blending system 200 includes a plurality of sensors 210, 220, 230, 240, and 250. The plurality of sensors 210, 220, 230, 240, and 250 are in electromagnetic communication with computer control system 270 via data links 260, 360, 370, 380, and 390, respectively.

First sensor 210 corresponds to the first sensor measurement 20 of the method shown in FIG. 1. First sensor 210 measures the quantity and composition of dirt, mud, or other macroscopic debris formed on the surface of the vehicle (not shown). The sensor may utilize measurements of reflectance or scattering of infrared light, ultraviolet light, visible light, radio frequency electromagnetic radiation, or the like. Typical optical reflectance/scattering sensors employ fiber optics to measure light backscatter; i.e., light reflected off particles in the opposite direction of incidence. Reflectance sensors are well-known in the art and one such sensor is the FiberView Sensor produced by Reflectronics, Inc., of Lexington, Ky.

Second sensor 220 corresponds to the measurement of the thickness and composition of surface film coating of step 30 of the method shown in FIG. 1. Due to acid rain and other environmental conditions, along with sprays of chemical compositions, both organic and inorganic, from road travel and external environmental conditions, vehicles typically have a thin film of minerals and various chemical compounds formed on their surfaces. Typically, these films are formed from aluminum, magnesium silicates, titanium dioxide, sulfates, chlorides, and carbonates of iron, copper, calcium, sodium, magnesium, and potassium. Aluminum, iron, calcium, and silicon layers are often formed from soil erosion, rock dust, and coal combustion. A carbon surface film often comes from the incomplete combustion of carbonaceous fuels. Sodium chloride layers typically form due to marine aerosols, and chloride from the incineration of organo chlorine polymer wastes. Additionally, surface films found on vehicles include various types of soil, rubber, exhaust gases, salt, sand, herbacides, pesticides, fertilizers, brake dust, industrial pollutants, and the like.

The second sensor 220 is a reflectance or backscattering sensor, similar to the first sensor 210. The sensor may utilize visible light, infrared light, ultraviolet light, radio frequency electromagnetic radiation, X-rays, or the like. Additionally, the second sensor 220 may include an ultraviolet fluorescence sensors. Ultraviolet fluorescence sensors are well-known in the art and one such sensor is the Ultra-Violet Fluorescence Sensor Model 120 manufactured by NDC Infrared Engineering of Irwindale, Calif.

The third sensor 230 corresponds to the measurement of the vehicle surface temperature of step 40 of the method shown in FIG. 1. The vehicle surface temperature may be measured through measurement of infrared radiation being emitted by the vehicle, or may be performed by a standard contact thermometer.

The fourth sensor 240 corresponds to the measurement of water purity and quality of step 50 of the method shown in FIG. 1. In order to completely and efficiently remove both the macroscopic debris and the surface film formed on the surface of the vehicle, the water used in the wash cycle must have sufficient purity and quality. Activity, pH, temperature, turbidity, and levels of dissolved salts and other solids must be measured. Multi-parameter water analyzers are well-known in the art. One such water analyzer is the PHH-500 Multi-Parameter Water Analyzer produced by Omega Engineering, Ltd., of Stamford, Conn.

The fifth sensor 250 corresponds to the measurement of environmental conditions of step 60 of the method shown in FIG. 1. Determination of the proper quantities and concentrations of cleaning components are dependent upon the external temperature, humidity, and precipitation. Humidity and temperature probes are well-known in the art. One such probe is the MP101A Meteorological Probe produced by Rotronic of Huntington, N.Y.

The measurements of sensors 210, 220, 230, 240, and 250 are transmitted to computer control system 270 via data links 260, 360, 370, 380, and 390, respectively. The data links 260, 360, 370, 380, and 390 may be electrical cables, optical interfaces, or any other electromagnetic means of communication.

Based upon the measurements of the quantity and composition of dirt, mud, and other macroscopic debris, the thickness and composition of surface film formed on the vehicle, the car surface temperature, the water purity and quality, and the external environmental conditions, the computer control system 270 calculates the proper quantities of presoak solution components necessary for the formation of a presoak solution.

The presoak solution is applied to the surface of the vehicle to act on the macroscopic debris and surface film in order to break down the structure and composition of the debris and film in order to make washing more effective. The presoak solution is made from a blend of several separate chemical components and water. One of the components might typically be an alkali/builder soap. Another one of the components might be an ionic soap. Other soap blend components may be an alternative ionic soap that has a different polarity, a polymer, an enzyme solution, or any of a wide variety of cleaning solutions that have different cleaning characteristics or different cost materials than either the alkali/builder soap or the ionic soap.

In order to determine the proper soap blend to be used, the vehicle appearance is classified as being either predominantly dirt/mud or predominantly film covered. Additionally, the external environmental conditions of the past two or three days is taken into account. Weather conditions change the adhesion properties of surface films. The particular blend of soap components is optimized to clean the car the most efficiently.

As shown in FIG. 4, the computer control system 270 receives the input data of sensors 210, 220, 230, 240, and 250 at step 410. The computer control system 270 forms a data vector from the input data at step 420. For example, if first sensor 210 generates measurement a, second sensor 220 generates measurement b, third sensor 230 generates measurement c, fourth sensor 240 generates measurement d, and fifth sensor 250 generates a measurement e, then computer control system 270 forms a data vector of the form (a, b, c, d, e).

Computer control system 270 has a pre-set vector space stored within. As shown in FIG. 2, the vector space includes a plurality of pre-set regions corresponding to blends of presoak solution components. FIG. 2 is only a two-dimensional representation of a vector space, whereas the true dimensionality of the vector space is dependent on how many different types of sensor readings are taken and utilized.

The example of FIG. 2 utilizes only a UV-fluorescence measurement on one axis and a surface temperature measurement on the other axis. Blend regions 1, 2, 3, and 4 are pre-calculated to provide optimal cleaning power based upon specific UV-fluorescence and surface temperature measurements. As shown in FIG. 2, blend 1, blend 2, blend 3, and blend 4 overlap within the vector space. Thus, the system must calculate the optimal blend to use for a given set of data points, despite the fact that the blend regions do overlap in the vector space.

At step 430 of FIG. 4, the computer control system 270 plots the data vector of step 420 within the pre-set vector space. In FIG. 2, two exemplary data vectors A and B are shown for illustrative purposes.

Data vector A of FIG. 2 represents an actual measurement of UV-fluorescence and surface temperature measured from the vehicle to be washed. As shown, point A lies outside of the spaces in the vector space occupied by blends 1, 2, 3, and 4. However, through a distance measurement, it can be easily seen that the point A lies closest to the center of blend 3. This distance measurement is performed at step 440 in the process of FIG. 4. Thus, blend 3 would be used to form a presoak solution for the vehicle under the conditions of vector A. Although vector A does not lie within the vector space of blend 3, blend 3 would be more effective at breaking down the dirt, mud, and surface film formed on the vehicle than blends 1, 2, or 4.

Vector B of FIG. 2 lies within the vector space occupied by both blends 3 and 4. However, a distance measurement shows that point B is closer to the center of the vector space of blend 4 than the center of blend 3. Thus, blend 4 would be used to form a presoak solution for the vehicle under the conditions of point B. Although blend 3 would also be effective, the proximity of point B to the center of the vector space of blend 4 suggests that blend 4 would be more effective in breaking down the dirt, mud, macroscopic debris, and surface film formed on the vehicle.

The computer control system 270 calculates the distances between the data vector and the centers of each of the blend vector spaces at step 440 in FIG. 4. At step 450, the computer control system 270, of FIG. 3, determines the minimum distance. The minimum distance found from the multiplicity of distances between the data vector and the respective centers of the blend vector spaces determines the blend to be used for optimal cleaning of the vehicle (step 460).

Although the sensors measure various parametric data including the measurement of type and thickness of macroscopic debris, composition and thickness of surface film formed on the surface of the vehicle, surface temperature of the vehicle, water purity and quality, and external environmental conditions, any number of these parameters, or any combination of these parameters, may be utilized. For example, a car wash blending system utilizing only external environmental data may be preferred.

Once the proper blend of presoak solution components has been determined, the computer control system 270 communicates with a presoak blending and application sub-system 280 via data link 320. The presoak blending and application sub-system 280 blends the presoak solution from individual presoak solution components. The proper quantities and concentrations of the presoak solution components correspond to the pre-set blends stored in computer system 270.

Once the presoak blending and application sub-system 280 blends the presoak solution from the predetermined quantities of presoak solution components, a presoak solution monitor 400 measures the quantities of the presoak solution components in the presoak solution. The presoak solution monitor 400 communicates the presoak component quantity data to computer control system 270 via data link 470. This corresponds to step 90 of the method shown in FIG. 1. Because the proper quantities, ratios, and concentrations of the presoak solution components are essential to the effective and efficient breaking down of dirt, mud, macroscopic debris, and surface film formed on the vehicle, it is necessary to ensure that the actual blended presoak solution conforms to the calculated quantities, ratios, and concentrations determined by computer control system 270.

Computer control system 270 determines whether the measured quantities of presoak solution components are within a certain error tolerance of the calculated pre-set quantities for the individual blend to be used. The concentration of each soap component can be determined by measuring intrinsic properties of the soap blend or by adding trace elements to each component, such as a particular color or dye.

If the computer control system 270 determines that the presoak solution components do not match the calculated quantities and concentrations within the error tolerance, the computer control system 270 makes adjustments to valve positions, pump pressures, and other sources of mechanical or fluid error within presoak blending and application sub-system 280. Computer control system 270 then instructs presoak blending and application sub-system 280, via data link 320, to form a new presoak solution. The new presoak solution is then monitored, once again, by presoak solution monitor 400. This corresponds to decision block 100 of the method shown in FIG. 1.

Once computer control system 270 determines that the presoak solution contains the proper concentrations of the presoak components, the computer control system 270 instructs the presoak blending and application sub-system 280 to apply the presoak solution to the vehicle surface. Once the presoak solution has been applied to the vehicle surface by presoak blending and application sub-system 280, presoak enhancing agents may also be added to the vehicle by presoak enhancer and blending application sub-system 290.

Foam soaps or other chemical compounds may be applied as necessary to enhance the cleaning ability of the presoak solution. The use of the presoak enhancers is considered and applied as determined by the vehicle's condition and external environmental factors. The computer control system 270 determines the proper quantities of the presoak enhancing agents based upon the readings of sensors 210, 220, 230, 240, and 250, respectively. Computer control system 270 communicates with presoak enhancer blending and application sub-system 290 via data link 330.

At step 130, of FIG. 1, the computer control system 270 calculates the number and type of wash cycles based on the varied sensor readings. Depending on the quantity and type of dirt, mud, debris, and surface film, along with the environmental conditions, different types of car washes are required. The duration of the car wash, the use of friction brushes or other types of brushes, the types and quantities of foaming detergents, and the wash speed represent some of the individual elements of each type of car wash.

The dominant dirt type and environmental conditions are used to determine the wash parameters, such as the number of wash cycles, the use of brushes, and the water volume and pressure. The selections are also dependent on the individual car wash, since not all car wash installations have the same technologies or settings. Both the water pressure and volume are controlled and monitored to insure wash quality. Failures may be detected by a car wash monitor 480. Car wash monitor 480 is in electromagnetic communication with car wash sub-system 300. Car wash monitor 480 communicates with car wash sub-system 300 and car wash sub-system 300 communicates to computer control system 270 via data link 340. Computer control system 270 may adjust water pressure and volume and/or notify the operator of a failure based upon readings of car wash monitor 480.

The computer control system 270 determines the type and number of car washes dependent upon the readings of sensors 210, 220, 230, 240, and 250. The determination of type and number of washes is sent to car wash sub-system 300 via data link 340.

Once the computer control system 270 has calculated the number and type of wash cycles, the vehicle is washed by car wash sub-system 300. The computer control system then determines the number, speed, water pressure, and water volume of the necessary rinse cycles based upon the dominant dirt type. The calculation of the number and type of rinse cycles is based upon the sensor readings from sensors 210, 220, 230, 240, and 250. The water pressure and volume are regulated and measured by car wash monitor 480. Computer control system 270 instructs car rinse sub-system 310, via data link 350, as to the number and type of rinse cycles required. Once the vehicle has been rinsed according to the requirements generated by computer control system 270, the vehicle may be driven from the car wash installation.

Although this invention has been described in connection with specific forms and embodiments thereof, it will be appreciated that various modifications other than those discussed above may be resorted to without departing from the spirit or scope of the invention. For example, functionally equivalent elements may be substituted for those specifically shown and described, and in the formation method steps described, particular steps may be reversed or interposed, all without departing from the spirit or scope of the invention as defined in the appended Claims.

What is claimed is:

1. A customizable car wash blending method comprising the steps of:
    (a) positioning a vehicle in a location in correspondence with at least one set of sensors;
    (b) measuring by actuation of said sensors parametric data relating to debris from an environment external to said vehicle, said debris being formed on a surface of said vehicle;
    (c) automatically blending at ratios selected responsive to said measured parametric data a plurality of presoak components for forming a presoak solution; and,
    (d) applying said presoak solution to said vehicle.

2. The customizable car wash blending method as recited in claim 1 wherein said debris of said measurement step is microscopic debris.

3. The customizable car wash blending method as recited in claim 2 wherein said step of measuring parametric data includes the measurement of type and thickness of said macroscopic debris.

4. The customizable car wash blending method as recited in claim 1 wherein said debris of said measurement step is surface film.

5. The customizable car wash blending method as recited in claim 4 wherein said step of measuring parametric data includes the measurement of composition and thickness of said surface film formed on said surface of said vehicle.

6. The customizable car wash blending method as recited in claim 1 wherein said step of applying said presoak solution to said vehicle is followed by a step of applying predetermined quantities of presoak enhancers to said vehicle.

7. The customizable car wash blending method as recited in claim 6 wherein said presoak enhancers include foam soaps.

8. The customizable or wash blending method as recited in claim 1 wherein said step of applying said presoak solution to said vehicle is followed by a step of washing said vehicle in accordance with a predetermined number and type of wash cycles responsive to said measured parametric data.

9. The customizable car wash blending method as recited in claim 8 wherein said step of washing said vehicle is followed by a step of rinsing said vehicle in accordance with a predetermined number and type of rinse cycles responsive to said measured parametric data.

10. The customizable car wash blending method as recited in claim 1 wherein said at least one set of sensors includes an optical reflectance sensor.

11. The customizable car wash blending method as recited in claim 1 wherein said at least one set of sensors includes an infrared sensor.

12. The customizable car wash blending method as recited in claim 1 wherein said step of measuring parametric data includes a measurement of surface temperature of said surface of said vehicle.

13. The customizable car wash blending method as recited in claim 1 wherein said step of measuring parametric data includes measurement of purity and quality of water to be used in washing and rinsing said vehicle.

14. The customizable car wash blending method as recited in claim 1 wherein said step of measuring parametric data includes measurement of local environmental conditions.

15. The customizable car wash blending method as recited in claim 1 wherein said presoak components include alkali soaps.

16. The customizable car wash blending method as recited in claim 1 wherein said presoak components include ionic soaps.

17. The customizable car wash blending method as recited in claim 1 wherein said step of blending ratios of presoak components is followed by comparison between actual ratios of presoak components with calculated ratios of presoak components for accuracy monitoring.

18. A customizable car wash blending method comprising the steps of:
  (a) positioning a vehicle in a location in correspondence with at least one set of sensors;
  (b) automatically blending at ratios selected responsive to measurements made by said sensors a plurality of presoak components for forming a presoak solution, the measurements being indicative at least in part of a condition of a surface of the vehicle; and,
  (c) applying said presoak solution to said vehicle.

19. The customizable oar wash blending method as recited in claim 18 wherein said step of positioning a vehicle is followed by a step of measuring parametric data relating to macroscopic debris formed on a surface of said vehicle.

20. The customizable car wash blending method as recited in claim 19 wherein said step of measuring parametric data includes the measurement of type and thickness of said macroscopic debris.

21. The customizable car wash blending method as recited in claim 19 wherein said step of measuring parametric data includes a measurement of surface temperature of said surface of said vehicle.

22. The customizable car wash blending method as recited in claim 19 wherein said step of measuring parametric data includes measurement of purity and quality of water to be used in washing and rinsing said vehicle.

23. The customizable car wash blending method as recited in claim 19 wherein said step of measuring parametric data includes measurement of local environmental conditions.

24. The customizable car wash blending method as recited in claim 18 wherein said step of positioning a vehicle is followed by a step of measuring parametric data relating to surface film formed on a surface of said vehicle.

25. The customizable car wash blending method as recited in claim 24 wherein said step of measuring parametric data includes the measurements of composition and thickness of said surface film formed on said surface of said vehicle.

26. The customizable car wash blending method as recited in claim 24 wherein said step of measuring parametric data includes a measurement of surface temperature of said surface of said vehicle.

27. The customizable car wash blending method as recited in claim 24 wherein said step of measuring parametric data includes measurement of purity and quality of water to be used in washing and rinsing said vehicle.

28. The customizable car wash blending method as recited in claim 24 wherein said step of measuring parametric data includes measurement of local environmental conditions.

29. The customizable car wash blending method as recited in claim 18 wherein the step of applying said presoak solution is followed by a step of applying predetermined quantities of presoak enhancers to said vehicle.

30. The customizable car wash blending method as recited in claim 29 wherein said presoak enhancers include foam soaps.

31. The customizable car wash blending method as recited in claim 18 wherein the step of applying said presoak solution is followed by a step of washing said vehicle in accordance wit a predetermined number and type of wash cycles.

32. The customizable car wash blending method as recited in claim 31 wherein said step of washing said vehicle is followed by a step of rinsing said vehicle in accordance with a predetermined number and type of rinse cycles.

33. The customizable car wash blending method as recited in claim 18 wherein said at least one set of sensors includes an optical reflectance sensor.

34. The customizable car wash blending method as recited in claim 18 wherein said at least one set of sensors includes an infrared sensor.

35. The customizable car wash blending method as recited in claim 18 wherein said presoak components include alkali soaps.

36. The customizable car wash blending method as recited in claim 18 wherein said presoak components include ionic soaps.

37. The customizable car wash blending method as recited in claim 18 wherein said step of blending ratios of presoak components is followed by comparison between actual ratios of presoak components with calculated ratios of presoak components for accuracy monitoring.

38. An automatic vehicle wash blending method comprising the steps of:
(a) establishing a plurality of preset blending ratios;
(b) positioning a vehicle in a location in correspondence with a plurality of sensors, actuating the plurality of sensors to measure parametric data relating to debris disposed upon a surface of the vehicle;
(c) automatically blending to form a presoak solution a plurality of presoak components in quantities determined by said preset ratios selected responsive to said measured parametric data; and,
(d) applying said presoak solution to said vehicle.

* * * * *